US007375986B2

(12) United States Patent
Schmitt et al.

(10) Patent No.: US 7,375,986 B2
(45) Date of Patent: May 20, 2008

(54) METHOD AND DEVICE FOR PRODUCING AN ELECTRIC HEATING CURRENT, PARTICULARLY FOR INDUCTIVE HEATING OF A WORKPIECE

(75) Inventors: Klaus Schmitt, Giessen (DE); Wolfgang Schmidt, Reiskirchen (DE); Heiko Scheffler, Buseck (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 11/507,817

(22) Filed: Aug. 22, 2006

(65) Prior Publication Data

US 2007/0000917 A1 Jan. 4, 2007

Related U.S. Application Data

(63) Continuation of application No. PCT/EP2005/001662, filed on Feb. 18, 2005.

(51) Int. Cl.
*H02M 3/335* (2006.01)

(52) U.S. Cl. .......................... 363/17; 363/58; 219/672

(58) Field of Classification Search ............ 363/16–20, 363/56, 58, 98, 131, 132, 89, 97; 323/285, 323/259; 219/672, 639
See application file for complete search history.

(56) References Cited

U.S. PATENT DOCUMENTS

| | | | | |
|---|---|---|---|---|
| 4,953,068 | A * | 8/1990 | Henze | 363/17 |
| 5,644,484 | A * | 7/1997 | Elango | 363/98 |
| 6,031,740 | A * | 2/2000 | Budmiger | 363/58 |
| 6,362,462 | B1 * | 3/2002 | Merrell et al. | 219/672 |

FOREIGN PATENT DOCUMENTS

| | | |
|---|---|---|
| CH | 664660 | 3/1988 |
| DE | 19527827 | 1/1997 |
| EP | 1361780 | 11/2003 |

* cited by examiner

*Primary Examiner*—Rajnikant B. Patel
(74) *Attorney, Agent, or Firm*—Harness, Dickey & Pierce, P.L.C.

(57) ABSTRACT

A heating current used to inductively heat a metallic or magnetic work-piece is generated by an inverter supplied by a supply voltage. The inverter includes four switching elements arranged in an H-bridge circuit having two parallel longitudinal branches and a transverse branch. The switches are controlled so the heating current flows through the transverse branch. The diagonally opposed switching elements are switched from a conductive to a non-conductive state in a temporally staggered manner.

19 Claims, 4 Drawing Sheets

METHOD AND DEVICE FOR PRODUCING AN ELECTRIC HEATING CURRENT, PARTICULARLY FOR INDUCTIVE HEATING OF A WORKPIECE

CROSS-REFERENCE TO RELATED APPLICATIONS

This application is a continuation of PCT/EP2005/001662, filed Feb. 18, 2005 which claims priority to German Patent Application DE 10 2004 010 331.3, filed Feb. 25, 2004. The disclosures of the above applications are incorporated herein by reference.

FIELD

The present invention concerns a method for producing an electric heating current, in particular for inductive heating of a metallic or magnetic workpiece, wherein the heating current is produced from a supply voltage on the input side using an inverter, wherein the inverter has four controllable switching elements that are arranged with respect to one another in an H-bridge circuit with two parallel longitudinal branches and one transverse branch, and wherein pairs of switching elements located diagonally opposite one another in the H-bridge circuit are driven such that the heating current flows through the transverse branch.

The invention further concerns a device for producing an electric heating current having an input for providing a supply voltage, having an inverter that has four controllable switching elements that are arranged with respect to one another in an H-bridge circuit with two parallel longitudinal branches and one transverse branch, and having a drive circuit that is designed to drive pairs of switching elements located diagonally opposite one another in the H-bridge circuit such that the heating current flows through the transverse branch.

BACKGROUND

Such a method and a suitable device are known from CH 664,660 A5. The known device has been used in practice for many years to inductively heat metallic or magnetic workpieces. In addition, it generally can also be used for resistive heating of workpieces. In the case of inductive heating, the heating current flows through an inductance arranged in the transverse branch of the H-bridge circuit, called the inductor. The heating current produces an alternating magnetic field in the inductor, which gives rise to induced currents in the workpiece to be heated (either directly or by means of an intermediate transformer). These induced currents cause heating as a result of the ohmic losses in the workpiece. By contrast, in the case of resistive heating the heating current would be passed directly through the workpiece.

The speed and the degree of heating can be adjusted selectively using the inverter. This is typically accomplished by pulse-width modulation and/or frequency modulation of the heating current. In other words, the pulse/space ratio and/or the frequency of current pulses in the transverse branch of the inverter are varied in this way.

To achieve this, the four switching elements of the inverter are switched on and off again in groups, wherein the switching elements diagonally opposite one another are switched simultaneously in each case. The resulting currents are described below using FIGS. 3 and 4 to better elucidate the invention.

Another generic arrangement is known from DE 195 27 827 C2, wherein the inverter is represented only symbolically in this document. In order to achieve effective operation, this document proposes compensating the reactive power that arises in the vicinity of the inductor in a capacitance placed ahead of the inverter. Specifically, in this case the purpose is to transfer to the capacitor the energy that is stored in the inductor when the inverter is commutated, since the current through the inductor cannot abruptly change ("jump") when the switching elements are commutated. Accordingly, the size of the capacitance should be based on the amount of energy to be absorbed (called reactive power in DE 195 27 827 C2), wherein a large capacitance on the order of 1 to 15 mF is proposed.

The frequencies at which the heating current is commutated in the inductor can be in the range of 50 Hz to 100 KHz, for example. Accordingly, it is not only necessary for the upstream compensation capacitor to be adequately rated with regard to its size, but it must also be suitable for HF use. Suitable capacitors are quite expensive.

Another problem with the known circuit is that the switching elements in the inverter can be destroyed if the compensation capacitor is not adequately rated. The risk of destruction arises in particular when the heating circuit is operated with no load, i.e. without a workpiece to be heated. Accidentally turning on the heating circuit without a workpiece can thus lead to destruction of the switching elements in the inverter under unfavorable conditions.

A third problem with the known arrangement is high frequency interference, which can arise through abrupt commutation of the switching elements in the inverter and can feed back into the input-side line voltage. In view of the increasingly stringent requirements with respect to electromagnetic compatibility (EMC), expensive filter circuits on the line input side are needed to suppress this interference.

SUMMARY

With this in mind, one object of the present invention is to specify a method and a device of the aforementioned type that solves said problems in a cost-effective manner. In particular, the new method and the corresponding device should permit reliable operation independent of the load state of the heating circuit, and, in so doing, generate as little HF interference as possible.

This object is attained in one aspect of the invention by a method of the above-mentioned type wherein the switching elements diagonally opposite one another are switched from the conducting to the non-conducting state at staggered times from one another. Another aspect of this object is attained by a device of the above-mentioned type wherein the drive circuit additionally is designed such that it switches the diagonally opposite switching elements from the conducting to the non-conducting state at staggered times.

The present invention differs from the approach practiced to date, in which the diagonally opposite switching elements of the H-bridge circuit are switched on and off at the same time. As is demonstrated below with a detailed analysis, the simultaneous turnoff of diagonally opposite switching elements has the consequence that at commutation the current flowing in the branch of the compensation capacitor experiences a reversal of direction with an extremely steep switching transition (dI/dt on the order of up to 1000 A/μs). This abrupt current reversal is a primary cause of the high frequency interference mentioned, which necessitates correspondingly expensive filter circuits on the line input side. As a result of the fact that diagonally opposite switching elements are switched off at staggered times in accordance with the present invention, which is to say one after the other, the degree of the current reversal is mitigated. In a preferred application, the diagonally opposite switching elements are driven at staggered times with respect to one another such that essentially no current reversal arises at the compensation capacitor. Accordingly, the filter circuits for suppressing electromagnetic interference can be simpler and thus less expensive.

Another advantage of the novel switching behavior is that little or none of the energy in the inductor is transferred to the compensation capacitor, specifically as a function of the length of time by which the switch-off of diagonally opposite switching elements is staggered. As a result, the compensation capacitor can be rated significantly smaller without the risk of destroying the switching elements in the inverter under unfavorable operating conditions (no-load operation of the inductor). The use of a smaller capacitor at this point permits further cost reductions, although it may nevertheless be advisable to use a larger capacitor for other reasons. These other reasons include, in particular, leveling out line voltage variations that frequently arise in harsh production environments, such as automotive body manufacture. However, such line voltage variations can also be leveled out by an appropriately rated capacitance in another location, so the present invention offers a larger range of options for designing the heating circuit. In particular, the invention makes it possible to implement the large capacitance for leveling out line voltage variations as an electrolytic capacitor while using a smaller, HF-rated foil capacitor for the compensation capacitor.

Thus, on the whole the new switching behavior makes it possible to achieve reliable operation with less electromagnetic interference in an inexpensive manner. Hence, the aforementioned object is attained fully.

In a preferred embodiment of the invention, the diagonally opposite switching elements are switched simultaneously from the non-conducting state to the conducting state.

This design corresponds in principle to the turn-on method that has been practiced heretofore wherein diagonally opposite switching elements are switched on simultaneously. It is self-evident that the term "simultaneously" here means "essentially simultaneously," since absolutely exact simultaneity cannot be ensured in practice.

In conjunction with the present invention, this design has the advantage that the "new" current direction through the inductor is available after commutation without additional delay. This offers a larger range of design options and thus increased flexibility with respect to the staggered timing of the switching processes when switching off the other diagonally opposite switching element. In other words, with this design the overall time required for commutation is expended almost exclusively in overcoming the problems identified above. Moreover, control system complexity is reduced in this embodiment of the invention.

In another embodiment, one set of diagonally opposite switching elements (which is to say the first set) is not switched to the conducting state until after the other diagonally opposite switching elements (the second set) are switched from the conducting state to the non-conducting state.

In principle, it would also be possible to deviate from this method and interleave the switch-on and switch-off of the switching elements in a time sequence. In comparison, the present invention has the advantage that a maximum heating current always flows in the transverse branch of the inverter, accelerating the heating of the workpiece.

In another embodiment, first one of the diagonally opposite switching elements is switched to the non-conducting state to start with, and the second diagonally opposite switching element is subsequently switched to the non-conducting state as a function of the heating current in the transverse branch. In this embodiment, the staggered timing in switching off the diagonally opposite switching elements is not determined arbitrarily, empirically, or as a predetermined fixed value, but instead is derived from the present value of the heating current in the transverse branch. As is demonstrated below in the explanation of the preferred example embodiments, the heating circuit is electrically isolated from the rest of the circuit after the first diagonal switching element is turned off. The value of the heating current in this case is determined largely by the inductor's inductance and by the load to be heated. The heating current itself results primarily from the energy stored in the inductor. The optimal time to switch off the second diagonal switching element can be determined by measuring the decaying heating current. More particularly, a very finely adjustable control of the heating current can be implemented in this embodiment.

In another embodiment, the heating current in the transverse branch is passed through a consumer, in particular an inductor, and the second of the diagonally opposite switching elements is switched to the non-conducting state as a function of a voltage across the consumer. This embodiment provides a second control parameter that can be used to determine the time offset for switchoff of the diagonal switching elements. An optimal switching time can also be determined using the voltage present at the consumer. It is especially preferred for the time offset to be determined on the basis of both the heating current and the voltage present at the consumer, since a particularly exact and flexible control is possible in this case.

In another embodiment, the H-bridge circuit is supplied from a first capacitor arranged in parallel to the switching elements, and the heating current is passed through an inductance in the transverse branch. This embodiment is especially suitable for inductive heating of the workpiece. Alternatively, however, the arrangement according to the invention can generally also be used for resistive heating. The advantages described above are particularly useful in inductive heating, however, since the inductance arranged in the transverse branch in this application prevents an abrupt current reversal in the transverse branch and hence gives rise to the problems mentioned above.

In another embodiment, the diagonally opposite switching elements are switched to the non-conducting state with staggered timing such that a maximum of 20% of the energy stored in the inductance, and preferably a maximum of 10%, is transferred to the capacitor. In general it is preferable if the energy in the transverse branch of the inverter need not be transferred to the compensation capacitor at all, since no current reversal occurs at the compensation capacitor in this case. In addition, in this case all of the energy is available for heating the workpiece. Since the current through the inductor decays exponentially, however, it can be advantageous for a flexible and rapid control method to accept a certain amount of current reversal at the compensation capacitor. In order to avoid the above-mentioned problems effectively, the threshold value specified here has proven to be a practical solution without the necessity for precisely maintaining the threshold value. It is far more important for the compensation capacitor to remain adequately far from its maximum state of charge during the (accepted or tolerated) transfer of energy in order to reliably prevent destruction of the switching elements in the inverter.

In another embodiment, the diagonally opposite switching elements are switched to the non-conducting state with staggered timing such that a current through the capacitor in a first conduction direction is significantly larger than in the opposite direction. The current in the opposite direction is preferably a maximum of 20%, better yet a maximum of 10%, of the current in the primary direction. This embodiment is another criterion for achieving the optimal time offset in switching off the diagonal switching elements. In this regard this embodiment offers the advantage that the specified design parameters can be acquired very easily so that the desired time offset can be set easily.

In another embodiment of the invention, the supply voltage is smoothed by a second capacitor, wherein the second capacitor is larger than the first capacitor. This embodiment builds on the variant described above in which a “small” HF-rated capacitor is used for compensation or energy storage during commutation of the inverter, while a larger and not necessarily HF-rated capacitor serves as a buffer capacitor to level out external line fluctuations. This embodiment has the advantage that the overall costs of the device can be reduced despite the increased component count.

Although the method described and the new device generally can also be used for other applications, the preferred application is inductive heating of a metallic and/or magnetic workpiece, specifically in the one-sided fastening of a metallic stud to a substrate. The novel method is most especially preferred for gluing studs to automotive body components. The advantages described above come into play with particular effect in this application. It goes without saying that the features mentioned above and those described below can be used not only in the combinations specifically mentioned, but also alone or in other combinations, without departing from the scope of the present invention.

DRAWINGS

Example embodiments of the invention are shown in the drawings and are explained in detail in the description below. Shown are:

Figure 3:
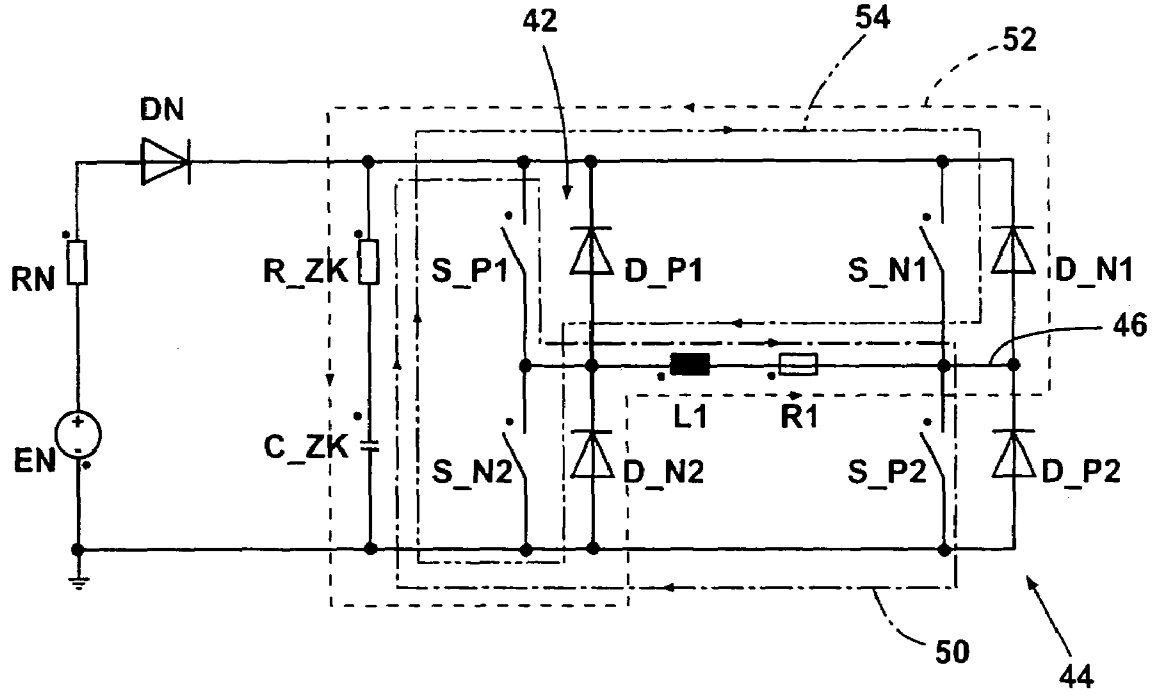
FIG. 3 is the electrical schematic diagram of a generic device for inductive heating of metallic workpieces.
Figure 4:
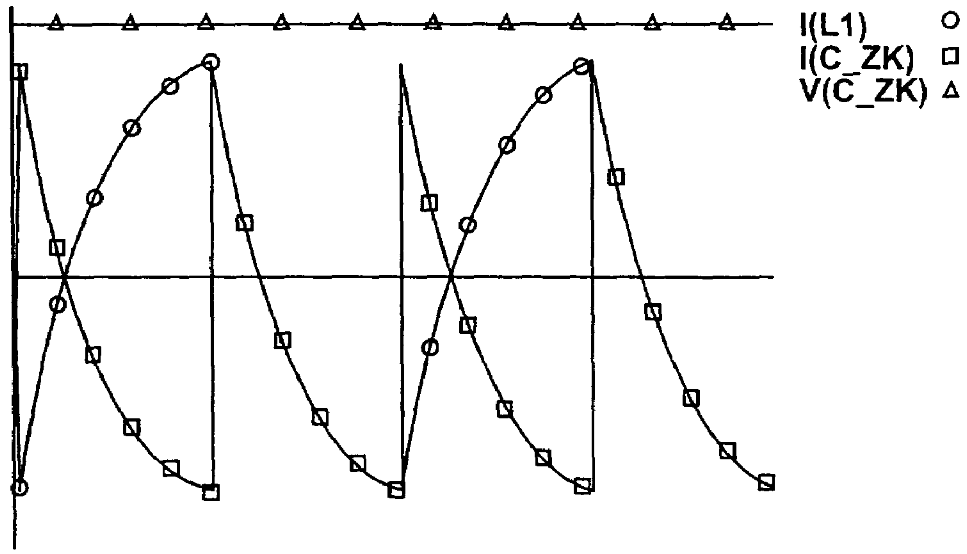
Figure 5:
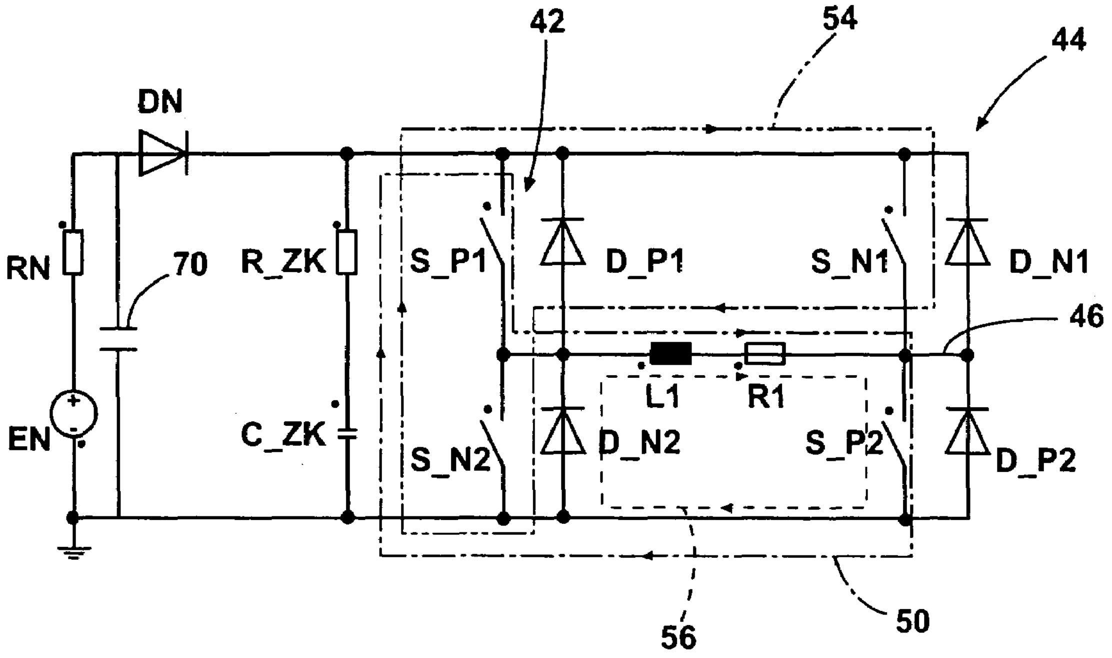
Figure 6:
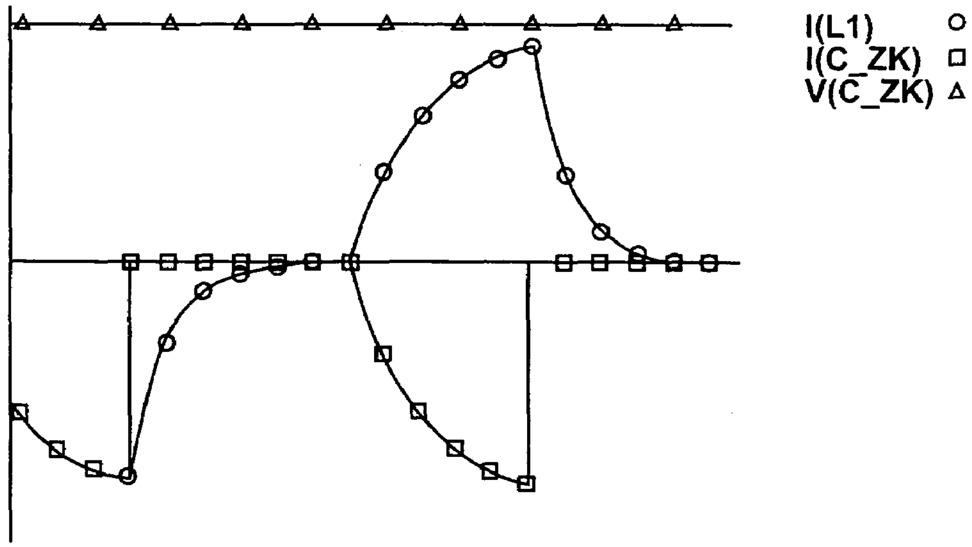
Figure 7:
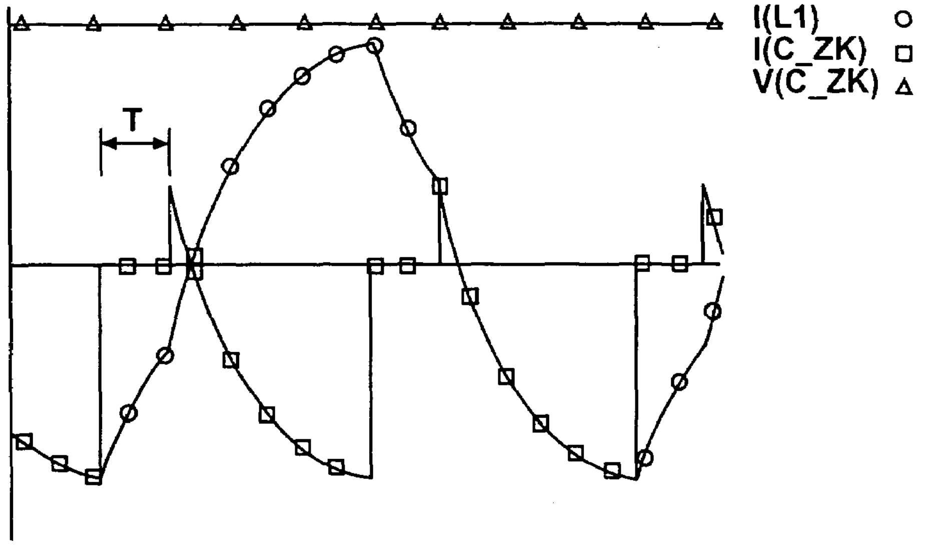
Figure 8:
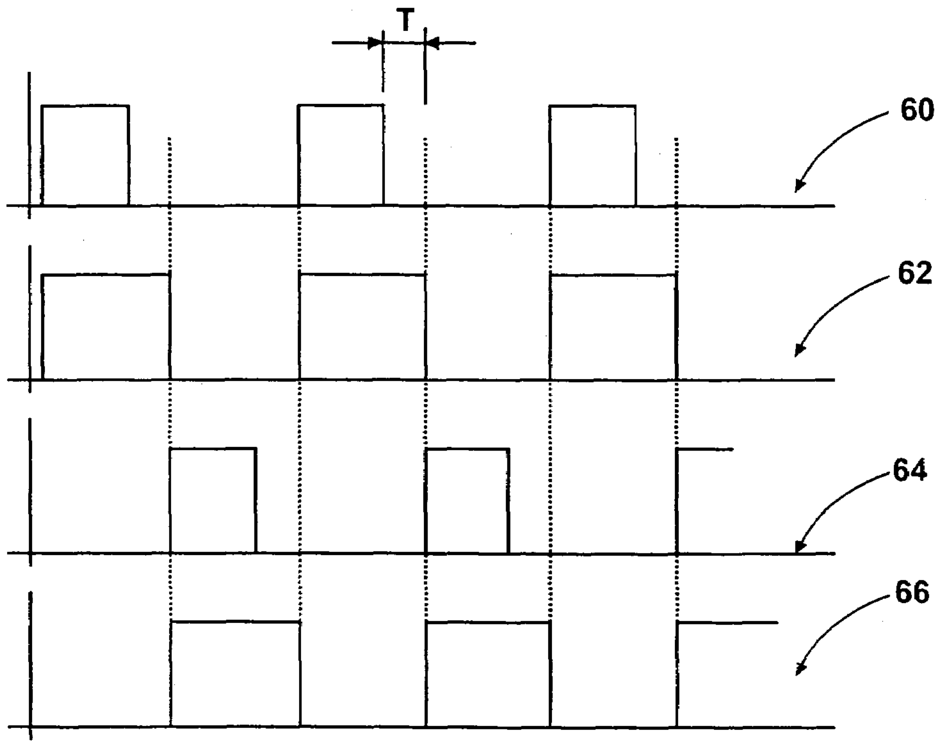

FIG. 4 provides selected current and voltage curves in the device from FIG. 3;

FIG. 5 is the electrical schematic diagram of a device preferred according to the invention for inductive heating of workpieces;

FIG. 6 provides selected current and voltage curves in the device from FIG. 5;

FIG. 7 provides selected current and voltage curves in the device from FIG. 5 in an alternate mode of operation; and FIG. 8 is a schematic representation of the switching sequences for the switching elements in the device from FIG. 5.

DETAILED DESCRIPTION

Figure 1:
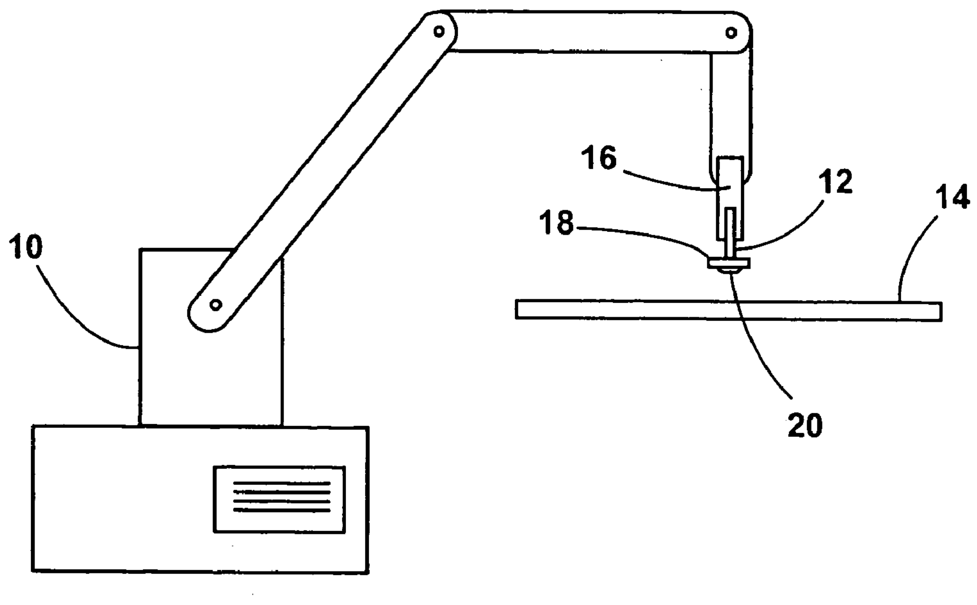
FIG. 1 is a simplified schematic representation of a robot that attaches a metallic bolt to a plate using the novel method.

FIG. 1 shows a simplified representation of a robot 10 that glues a bolt 12 to a plate 14. The robot 10 has a gripper mechanism 16 that holds the stud 12. Also located in the gripper mechanism 16 is a device according to the invention for heating the stud (not shown here). The stud 12 has at its bottom a flange 18, and a glue 20 is applied to the underside thereof. The glue 20 hardens through heating, so that the robot 10 can fasten the stud 12 to the plate 14 by controlled thermal heating. In general, however, the invention is not restricted to this preferred application.

Figure 2:
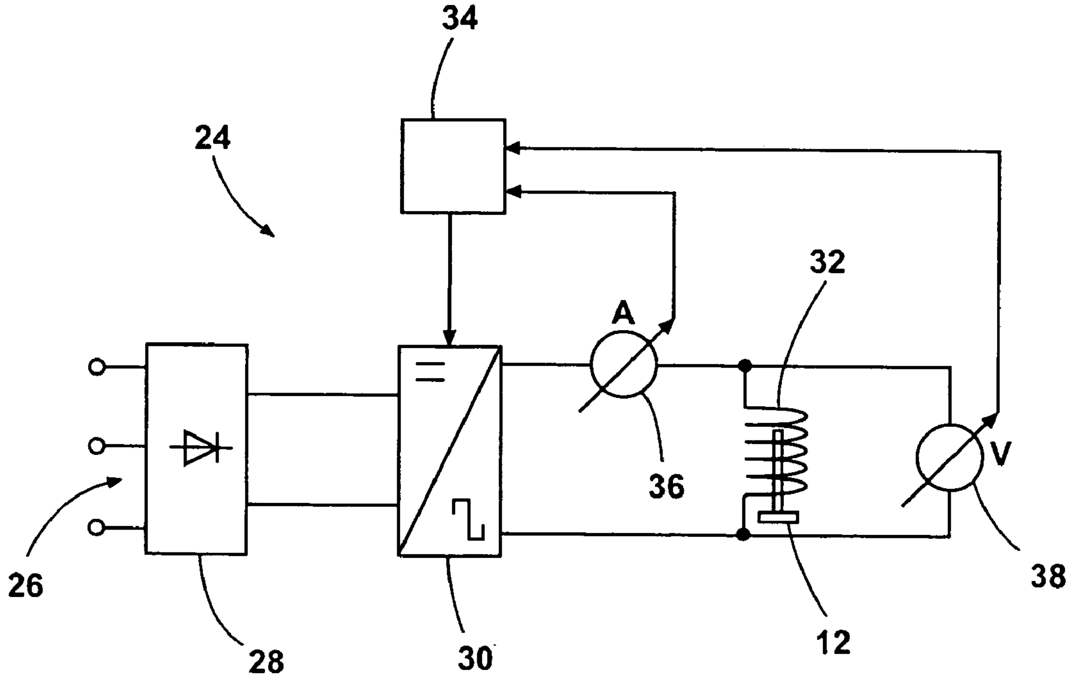
FIG. 2 is a simplified block diagram of the device according to the invention.

In FIG. 2, a device according to the invention for heating the stud 12 is labeled overall with the reference number 24. The device 24 has an input 26 for providing a supply voltage. In the preferred applications this is a three-phase supply voltage, which is why the input 26 is shown here with three connections. The provided supply voltage is rectified and smoothed here by a rectifier 28. Hence, a smoothed DC voltage is present at the inverter 30 that follows. The inverter 30 produces from the supplied DC voltage a time-varying heating voltage, which in the preferred example embodiment flows through an induction coil 32. The induction coil 32 surrounds the shank of the metallic stud 12 so that the stud 12 is inductively heated by the heating current.

The arrangement in FIG. 2 is shown in simplified form. In general, the induction coil 32 could also be connected to the inverter 30 through a transformer that is not shown here. However, the present invention is independent of whether or not such a transformer is used.

The reference number 34 identifies a drive circuit that controls switching elements (not shown here) in the inverter 30 in the manner described below. The manner of control determines the waveform of the heating current in the induction coil 32, and thus the thermal heating of the stud 12. In the preferred example embodiment shown here, the drive circuit 34 receives measured signals from a current sensor 36 and a voltage sensor 38, which can be used to determine the heating current through the induction coil 32 and the voltage across the induction coil 32. The drive circuit 34 uses the measured values received to determine the time offset in switching off diagonally opposite switching elements in the inverter 30 (as described below). Alternatively, the drive circuit 34 could also be provided with preset, fixed delay times so that the current sensor 36 and the voltage sensor 38 could be omitted in this case. Moreover, the current sensor 36 and the voltage sensor 38 can also be used as alternatives to one another in other example embodiments.

FIG. 3 shows the circuit design of a generic arrangement on which the present invention is based. The line side input voltage is represented in FIG. 3 as a voltage source EN and an (internal) resistance RN. A diode DN symbolizes the rectifier 28. The voltage source EN, resistance RN, and diode DN are connected in series and provide the operating voltage for the drive circuit described below.

The drive circuit consists primarily of the inverter 30, which here contains four controllable switching elements (typically transistors) in an H-bridge arrangement. The four switching elements S_P1, S_N1, S_N2 and S_P2 are arranged in the four end branches of the H-bridge circuit. The switching elements S_P1 and S_N2 are connected in series in the first longitudinal branch 42, while the switching elements S_N1 and S_P2, connected in series, form the second longitudinal branch 44.

Arranged anti-parallel to each switching element is a freewheel diode oriented in the blocking direction, wherein the labels D_P1, D_N1, D_N2 and D_P2 are chosen to correspond to the labels of the relevant switching elements. Located in the transverse branch 46 of the H-bridge circuit are an inductance L1 and a resistance R1 that symbolizes the ohmic losses. In addition, a series circuit consisting of a compensation capacitor C_ZK and a loss resistance R_ZK is arranged in parallel to the two longitudinal branches 42, 44 of the H-bridge circuit.

In this arrangement that is known per se, each pair of diagonally opposite switching elements S_P1, S_P2 or S_N1, S_N2 is switched on and off at the same time, where only one diagonal branch is conducting while the other is blocking. This has the result that a current flows through the transverse branch 46 of the H-bridge circuit. In order to analyze the switching behavior, the assumed starting condition below is that a current passes along the dot-and-dash line 50, namely from the capacitor C_ZK through the resistance R_ZK, the switching element S_P1, the inductance L1, the resistance R1, and the switching element S_P2. This current flows clockwise through the components listed, where the switching elements S_P1, S_P2 are accordingly switched to the conducting state, while the switching elements S_N1 and S_N2 are in the non-conducting state.

If the switching elements S_P1, S_P2 are now simultaneously switched off, i.e. placed in their non-conducting state, a current path according to the dashed line 52 results. Since the current at the inductance L1 cannot jump, the inductance L1 drives the current through the freewheel diode D_N1 and the resistance R_ZK to the compensation capacitor C_ZK. From there, it passes through the freewheel diode D_N2 back to the inductance L1. As can be seen from the arrows, switching off the switching elements S_P1, S_P2 thus causes an abrupt current reversal in the branch of the compensation capacitor C_ZK.

The current waveform at the capacitor C_ZK is shown in FIG. 4 (curve with squares). It can be seen that the current jumps abruptly from its maximum negative value to its maximum positive value (specifically, when the switching elements S_P1, S_P2 are switched off). The capacitor is then recharged according to the usual exponential function. The voltage curve at the capacitor C_ZK has a sawtooth waveform. Nonetheless, the abrupt current reversal causes strong HF interference that must be suppressed by suitable filtering means. Moreover, in this application the capacitor C_ZK must be rated such that it can store all of the energy stored in the inductance L1 during recharge.

After the diagonally opposite switching elements S_N1 and S_N2 are switched on, the current passes along the path indicated by the line 54. When the switching elements S_N1 and S_N2 are switched off, another abrupt current reversal takes place at the capacitor C_ZK.

FIG. 5 shows a similar circuit design, but one wherein the inverter is driven according to the novel method. For the purpose of discussion, the same initial conditions are assumed, namely a current from the capacitor C_ZK through the resistance R_ZK, the switching element S_P1, the inductance L1, the resistance R1, and the switching element S_P2. If the switching element S_P1 is now switched off, but not switching element S_P2, the current induced in L1 passes through the resistance R1, the (closed) switching element S_P2 and the freewheel diode D_N2, as is indicated by the line 56. The lower circuit of the H-bridge circuit is thus decoupled from the rest of the circuit. No current reversal takes place at the capacitor C_ZK. Only when the energy stored in the induction coil L1 is largely dissipated is the switching element S_P2 also opened, and almost simultaneously to this the switching elements S_N1 and S_N2 are closed. This permits a renewed passage of current from the capacitor C_ZK through the switching elements S_N1 and S_N2 into the transverse branch of the H-bridge circuit, as indicated by the line 54.

The corresponding current and voltage waveforms at the capacitor C_ZK are shown in FIG. 6. When the first switching element S_P1 in the diagonal branch is switched off, the current at capacitor C_ZK jumps to zero. Not until the second diagonal switching element S_P2 is switched off and the other two diagonal switching elements S_N1 and S_N2 are switched on does current again pass through the capacitor, but in the same direction as before.

FIG. 7 shows a current waveform for a smaller time offset T between the switch-off processes. The current through the capacitor C_ZK jumps to zero when the first diagonal switching element S_P1 is switched off. Since the energy from the inductance L1 has not yet fully dissipated in this instance, the current in the branch of the capacitor C_ZK jumps in the opposite direction when the second switching element S_P2 is switched off, but to a lesser degree than in the generic method. In the present case, the current in the opposite direction is only approximately 10% (or less) of the maximum current in the primary direction.

FIG. 8 once more shows the switching waveforms for the four switching elements symbolically. A waveform 60 shows when the switching element S_P1 is switched on and off. Waveform 62 corresponds to switching element S_P2, waveform 64 to switching element S_N1, and waveform 66 to switching element S_N2. The respective diagonally opposite switching elements S_P1, S_P2 and S_N1, S_N2 are switched on and off as groups, where in each group one of the switching elements remains switched on longer than the other by the time offset T. The new diagonal group is switched on immediately after the second switching element of the other group has been switched off.

Based on the novel switching behavior, the capacitor C_ZK in the circuit arrangement of FIG. 5 can be rated smaller. An additional capacitor 70 is provided in the preferred example embodiment from FIG. 5 so that the line voltage fluctuations that frequently arise in harsh production environments can still be leveled out. The capacitor 70 can be located before or after the diode DN, but in any case in parallel to the switching elements.

What is claimed is:

1. A device for producing an electric heating current, comprising:
- an input for providing a supply voltage;
- an inverter having four controllable switching elements arranged with respect to one another in an H-bridge circuit having two parallel longitudinal branches and one transverse branch;
- a drive circuit operable to drive diagonally opposite pairs of the switching elements in the H-bridge circuit such that the heating current flows through the transverse branch; and
- a series circuit having a compensation capacitor and a loss resistance arranged in parallel to the two parallel longitudinal branches of the H-bridge circuit;
- wherein the drive circuit is operable to switch the diagonally opposite pairs of the switching elements from a conducting to a non-conducting state at staggered times.

2. The device of claim 1, further comprising:
- an induction coil operable to preheat a metallic stud;
- wherein the induction coil is connected to the inverter for inductive heating of the stud.

3. The device of claim 2, further comprising:

a grip mechanism operable to grip the stud; and a robot movably connectable to the grip mechanism operable to position the stud for connection of the stud to a workpiece.

4. The device of claim 3, further comprising:

a current sensor operable to identify a current flow through the induction coil;

wherein a measured value of the current flow is operably used by the drive circuit to control switching of the switching elements.

5. The device of claim 3, further comprising a voltage sensor operable to identify a voltage across the induction coil;

wherein a measured value of the voltage is operably used by the drive circuit to control switching of the switching elements.

6. The device of claim 2, further comprising:

first, second, third, and fourth diodes each connected in parallel with a corresponding one of the four controllable switching elements;

a voltage source connected to the H-bridge circuit;

a rectifier connected in series with the voltage source;

a compensation capacitor connected in parallel to each of the longitudinal branches operable to store less than a maximum current storable by the induction coil; and a second capacitor connected in parallel to each of the compensation capacitor and the longitudinal branches operable to level out line voltage fluctuations.

7. A device for producing an electric heating current, in particular for inductive heating of a metallic or magnetic workpiece, comprising:

an inverter having first, second, third, and fourth controllable switching elements each switchable between a conducting and a non-conducting state;

an H-bridge circuit including two parallel longitudinal branches and a transverse branch connecting the longitudinal branches, the first and fourth switching elements positioned in series in a first one of the two parallel longitudinal branches and the second and third switching elements positioned in series in a second one of the two parallel longitudinal branches;

a series circuit having a compensation capacitor and a loss resistance arranged in parallel to the two parallel longitudinal branches of the H-bridge circuit;

a supply voltage source connected to the inverter on an input side operable to create the electric heating current;

diagonally opposite pairs of the switching elements operable to direct flow of the heating current through the transverse branch, a first one of the pairs being the first and second switches and a second one of the pairs being the third and fourth switches; and a drive circuit operable to individually switch the diagonally opposite pairs of the switching elements from a conducting to a non-conducting state at staggered times.

8. The device of claim 7, further comprising:

an induction coil operable to preheat a metallic stud;

wherein the induction coil is connected to the inverter and operable to inductively heat the stud.

9. The device of claim 8, further comprising first, second, third, and fourth diodes each connected anti-parallel with the switching elements of the longitudinal branches;

a rectifier connected in series with the voltage source;

the compensation capacitor connected in parallel to each of the longitudinal branches operable to store less than a maximum current storable by the induction coil; and a second capacitor connected in parallel to each of the compensation capacitor and the longitudinal branches operable to level out line voltage fluctuations.

10. The device of claim 9, further comprising:

a grip mechanism operable to grip the stud; and a robot movably connectable to the grip mechanism operable to position the stud for connection of the stud to a workpiece.

11. A method for producing an electric heating current, in particular for inductive heating of a metallic or magnetic workpiece, the method comprising:

producing the heating current from a supply voltage on the input side using an inverter;

arranging the inverter having first, second, third, and fourth controllable switching elements in an H-bridge circuit, the H-bridge circuit having two parallel longitudinal branches and one transverse branch;

arranging a series circuit having a compensation capacitor and a loss resistance arranged in parallel to the two parallel longitudinal branches of the H-bridge circuit;

driving diagonally opposite pairs of the switching elements in the H-bridge circuit to direct flow of the heating current through an inductor positioned in the transverse branch; and switching first and second ones of the diagonally opposite pairs of the switching elements from a conducting state to a non-conducting state at staggered times such that an inductance of the inductor drives a current through the loss resistance to the compensation capacitor.

12. The method according to claim 11, further comprising simultaneously switching both switching elements of a first one of the diagonally opposite pairs from the conducting state to the non-conducting state.

13. The method according to claim 12, further comprising delaying switching a second one of the pairs of diagonally opposite switching elements to the conducting state until after the diagonally opposite switching elements of the first one of the diagonally opposite pairs are switched from the conducting state to the non-conducting state.

14. The method according to claims 11, further comprising:

switching the first switching element to the non-conducting state;

positioning the second switching element diagonally opposite to the first switching element; and switching the second switching element to the non-conducting state after the first switching element as a function of the heating current in the transverse branch.

15. The method according to claims 14, further comprising:

determining a voltage across the inductor; and switching the second one of the diagonally opposite switching elements to the non-conducting state as a function of the voltage across the inductor.

16. The method according to claim 15, further comprising switching the diagonally opposite switching elements to the non-conducting state with staggered timing such that a maximum of 20% of an energy stored in the inductor is transferred to the first capacitor.

17. The method according to claim 15, further comprising switching the diagonally opposite switching elements to the non-conducting state with staggered timing such that a maximum of 10% of an energy stored in the inductor is transferred to the first capacitor.

18. The method according to claim 15, further comprising switching the diagonally opposite switching elements to the non-conducting state with staggered timing such that a current through the first capacitor in a first conduction direction is larger than in an opposite direction.

19. The method according to claim 15, further comprising:

positioning a second capacitor in parallel with the first capacitor, wherein the second capacitor is larger than the first capacitor; and smoothing the voltage using the second capacitor.

* * * * *